US008814211B1

(12) United States Patent
Kohlndorfer et al.

(10) Patent No.: US 8,814,211 B1
(45) Date of Patent: Aug. 26, 2014

(54) LINEAR PRETENSIONER FOR MOTOR VEHICLE SEATBELT RESTRAINT SYSTEMS

(71) Applicant: Autoliv ASP, Inc., Ogden, UT (US)

(72) Inventors: Kenneth H. Kohlndorfer, Roseville, MI (US); Lawrence M. Refior, Romeo, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/827,247

(22) Filed: Mar. 14, 2013

(51) Int. Cl.
*B60R 22/195* (2006.01)

(52) U.S. Cl.
USPC .......... 280/806

(58) Field of Classification Search
USPC ............ 280/806, 807; 242/374; 297/470, 480
See application file for complete search history.

(56) References Cited

U.S. PATENT DOCUMENTS

| | | | | |
|---|---|---|---|---|
| 5,639,120 | A * | 6/1997 | Kmiec et al. | 280/806 |
| 6,068,664 | A | 5/2000 | Meyer et al. | |
| 6,419,271 | B1 * | 7/2002 | Yamada et al. | 280/806 |
| 6,863,308 | B2 * | 3/2005 | Motozawa | 280/806 |
| 6,877,776 | B2 * | 4/2005 | Ukita et al. | 280/806 |
| 7,063,353 | B2 * | 6/2006 | Wang | 280/735 |
| 7,172,218 | B2 * | 2/2007 | Nakano et al. | 280/806 |
| 7,490,857 | B2 * | 2/2009 | Tomita | 280/806 |
| 7,516,987 | B2 * | 4/2009 | Koide et al. | 280/806 |
| 7,533,902 | B2 * | 5/2009 | Arnold et al. | 280/806 |
| 8,196,961 | B2 * | 6/2012 | Lane et al. | 280/806 |
| 2011/0316265 | A1 * | 12/2011 | Lane, Jr. | 280/806 |
| 2012/0139324 | A1 * | 6/2012 | Masutani | 297/470 |

FOREIGN PATENT DOCUMENTS

| | | | | |
|---|---|---|---|---|
| EP | 827882 | A1 * | 3/1998 | B60R 22/18 |
| JP | 2005349858 | A * | 12/2005 | B60R 22/46 |

* cited by examiner

*Primary Examiner* — Faye M. Fleming
(74) *Attorney, Agent, or Firm* — Brinks Gilson & Lione

(57) ABSTRACT

A pretensioner for a motor vehicle belt restraint system mounted to a structure of the vehicle. The pretensioner is connected to a belt restraint component that is also connected to the belt restraint system. The pretensioner includes a conduit made of tubing and having first and second ends. At least a portion of the conduit defines an elongated piston bore with a piston slideably positioned therein. A cable is attached to the piston and extends through the conduit for connection to the belt restraint component. A micro-gas generator is also located within the conduit and positioned generally opposite of the piston. Upon activation of the micro-gas generator, a gas is generated in the piston bore and drives the piston such that the piston exerts tension on the cable and thereby on the belt restrain component.

16 Claims, 6 Drawing Sheets

LINEAR PRETENSIONER FOR MOTOR VEHICLE SEATBELT RESTRAINT SYSTEMS

BACKGROUND

1. Field of the Invention

The present invention generally relates to seatbelt restraint systems for motor vehicles. More particularly, the present invention relates to a linear pretensioner of a seatbelt restraint system in a motor vehicle.

2. Related Technology

Seatbelt restraint systems used for restraining occupants in a motor vehicle seat play an important role in reducing injury to the occupants in the unfortunate event of a vehicle crash. While there are several varieties of seatbelt restraint systems, the conventional "3-point" variety commonly has a lap belt section extending across the pelvis and a shoulder belt section crossing the upper torso of a seated occupant. The lap and shoulder belt sections are each connected to the vehicle structure by anchorages and may be further fastened to each other or formed portions of a continuous length of seatbelt webbing. Seatbelt restraint systems that are manually secured by the occupant ("active" types) also typically include a latch plate attached to the belt webbing. Such a system further includes a seatbelt buckle attached to the vehicle body structure by another anchorage. The latch plate is received by the buckle thereby allowing the seatbelt restraint system to be fastened, enabling restraint, and unfastened, allowing entrance and exit from the vehicle. Of the anchorages securing the lap and shoulder belt sections, one anchorage typically includes a belt retractor to store the belt webbing. This belt retractor may further act to manage belt tension loads during a crash situation. Seatbelt restraint systems, when deployed, effectively restrain the occupant during a collision.

OEM (Original Equipment Manufacturer) vehicle manufacturers often provide seatbelt restraint systems with pretensioning devices. These devices tension the seatbelt either prior to impact of the vehicle (also known as a "prepretensioner") during a collision or at an early stage of a sensed impact/collision so as to enhance occupant restraint performance This pretensioning takes out slack in the webbing and permits the seatbelt restraint system to engage the occupant early in the crash sequence.

One class of pretensioning devices is a pyrotechnic linear pretensioner (PLP). In one specific implementation, a PLP can be implemented as a pyrotechnic buckle pretensioner (PBP) that is attached to the seatbelt buckle. In another implementation, the PLP can be attached to a webbing guide loop or the anchorages connected to the opposing ends of the seatbelt webbing. Since both of the above types pull a seatbelt system component linearly to apply tension in the seatbelt webbing, both PLPs and PBPs are collectively referred to as PLPs. When a collision occurs, a pyrotechnic charge of the PLP is fired, producing an expanding gas that pressurizes a gas chamber within a tube. This pressure forces a piston to move in the tube. The piston is connected with the belt system by a cable or strap, and the stroking of the piston tightens or "pretensions" the belt against the occupant. Various examples of PLP and PBP designs are provided in U.S. Pat. No. 6,068,664, which is hereby incorporated by reference.

PLPs in accordance with the known design approaches utilize a machined or die cast combustion chamber and a tubular piston cylinder formed of aluminum or steel. The parts are typically threaded or staked together. In addition, there are mounting features formed as part of the combustion chamber or stampings. These mounting features are fastened to the die cast combustion chamber. Although these devices operate satisfactorily, the requirement of die casting or machining a solid metal blank results in a relatively heavy component and requires costly tooling and equipment for production.

Designers of automotive components are constantly striving to reduce the mass of the components as part of the goal of providing higher fuel efficiency for motor vehicles. Additionally, these same designers are also constantly striving to reduce costs in automotive components.

SUMMARY

In satisfying the above needs, as well as overcoming the enumerated drawbacks and other limitations of the related art, the present invention provides a pretensioner for a motor vehicle belt restraint system, the belt restraint system being of the type mountable to a structure of the motor vehicle and having a belt restraint component coupled thereto, the pretensioner adapted to be connected to the belt restraint component and, upon being activated, the pretensioner pulling the belt restraint component to pretension the belt restraint system, the pretensioner comprising: a conduit made of tubing and having first and second ends, at least a portion of the conduit defining an elongated piston bore; a piston slideably positioned in the piston bore; a cable attached to the piston, the cable extending through the conduit and being adapted for connection to the belt restraint component; a gas generator located within the conduit and being positioned generally opposite of the piston, whereby upon activation of the gas generator a gas is generated within the piston bore and drives the piston within the piston bore with the piston exerting tension on the cable and thereby the belt restrain component.

In another aspect of the invention, the conduit includes a straight section and a curved section, the curved section being located at the first end.

In a further aspect of the invention, the gas generator is generally located in the curved section of the conduit and the piston is located in the straight section of the conduit.

In yet another aspect of the invention, the cable extends into the conduit through the curved section.

In another aspect of the invention, the pretensioner includes a mounting bracket secured to the conduit, the mounting bracket being secured to the conduit by engagement of deformed sections of the mounting bracket and the conduit.

In another aspect of the invention, the pretensioner includes a mounting bracket secured to the conduit, a portion of the mounting bracket at least partially encircling the conduit.

In a further aspect of the invention, the conduit has a cross-sectional shape that is round over a majority of the conduit's length.

In an additional aspect of the invention, the conduit has a portion between its first and second ends that is non-round in cross-sectional shape.

In still a further aspect of the invention, the conduit is straight.

In another aspect of the invention, the conduit is a first conduit and a second conduit engages the first conduit between the first and second ends, the cable extending through the second conduit and into the first conduit.

In an additional aspect of the invention, the second conduit is substantially straight or curved along its length.

In yet a further aspect of the invention, the second conduit engages the first conduit at an oblique angle or a perpendicular angle to a longitudinal axis defined by the first conduit.

In another aspect, the present invention provides a belt restraint system for a motor vehicle, the belt restraint system comprising: a webbing having opposing ends and configured to be mounted to a structure of the motor vehicle; a latch plate supported by the webbing between the opposing ends, the latch plate defining a lap belt section and a shoulder belt section of the webbing; a buckle configured to be mounted to a structure of the motor vehicle, the latch plate being releasably engageable with the buckle; a belt restraint component configured to be mounted to a structure of the motor vehicle, the belt restraint component being connected to the webbing and applying tension to the webbing when tension is applied to the belt restraint component; a pretensioner configured to be mounted to a structure of the vehicle, the pretensioner further comprising: a conduit made of tubing and having first and second ends, the conduit forming an elongated piston bore; a piston slideably positioned in the piston bore; a cable attached to the piston, the cable extending through the conduit and being connected to the belt restraint component; and a gas generator located within the piston bore of the conduit and being positioned generally opposite of the piston; and whereby upon activation of the gas generator a gas is generated within the piston bore and drives the piston within the piston bore with the piston exerting tension on the cable and thereby on the belt restrain component, tension on the belt restrain component imparting tension in the webbing.

In another aspect of the invention, the conduit includes a straight section and a curved section, the curved section being located at the first end.

In a further aspect of the invention, the cable extends into the conduit through the curved section.

In an additional aspect of the invention, the gas generator is generally located in the curved section of the conduit and the piston is located in the straight section of the conduit.

In yet another aspect of the invention, the conduit is a first conduit and a second conduit engages the first conduit between the first and second ends, the cable extending through the second conduit and into the first conduit.

In still a further aspect of the invention, the second conduit is one of straight or curved along its length.

In yet an additional aspect of the invention, the second conduit engages the first conduit at an oblique angle or a perpendicular angle to a longitudinal axis defined by the first conduit.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION

Figure 1:
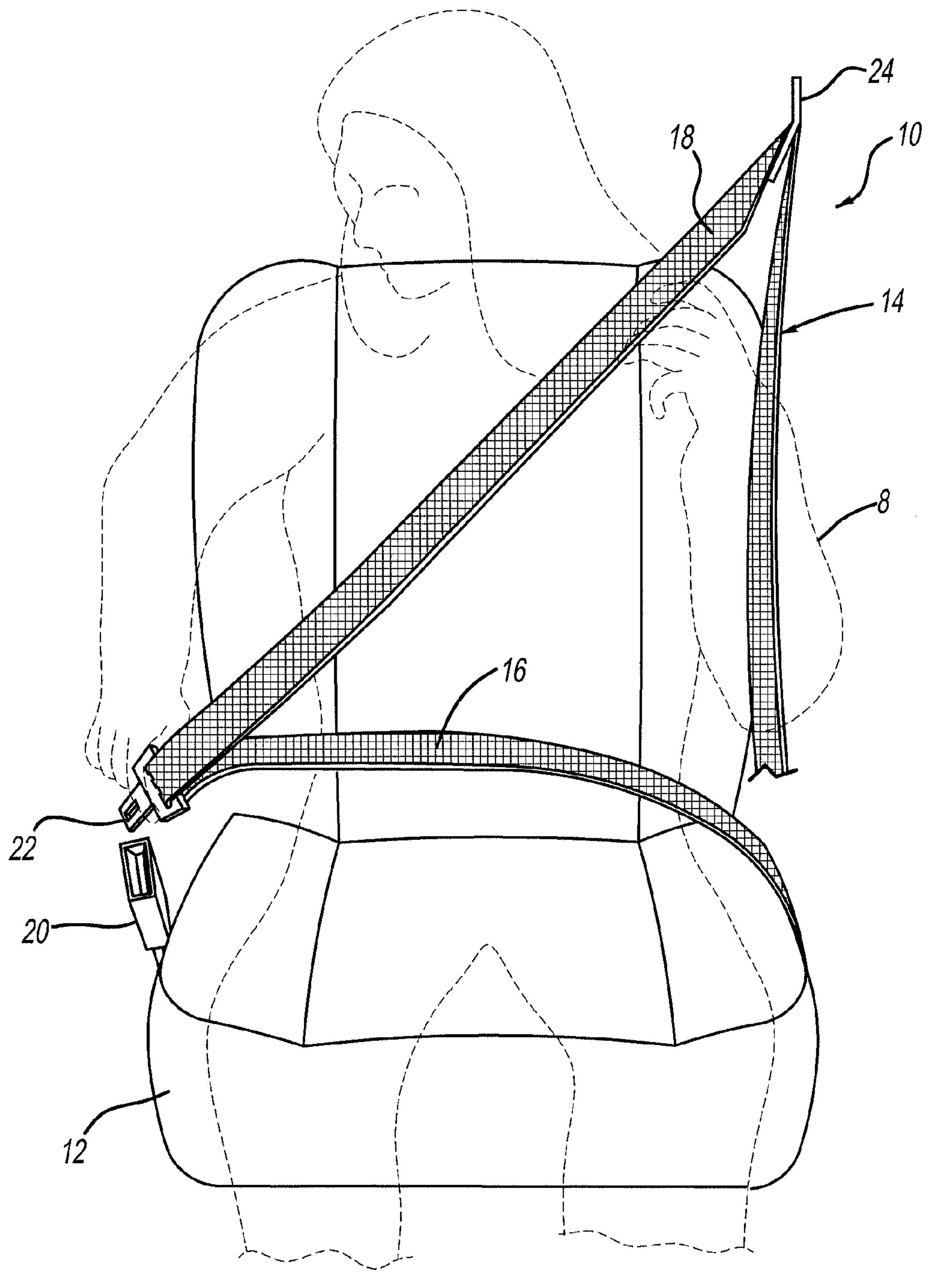
FIG. 1 is perspective view of a representative seatbelt restraint system that may incorporate the features of the present invention.

Referring now to the various figures, a representative seatbelt restraint system that may be used with a pretensioner incorporating principles of the present invention is generally illustrated in FIG. 1. The seatbelt restraint system 10 is used in conjunction with a vehicle seat 12 and includes a seatbelt 14 that is mounted to the vehicle body structure. One end of the seatbelt 14 is preferably connected to a retractor (not shown) that operates to retract the seatbelt 14, both when in use and when not in use.

The seatbelt 14 includes a lap belt section 16 and a shoulder belt section 18. The lap belt section 16, when deployed, extends across the pelvic region of an occupant 8 sitting on the seat 12 of the motor vehicle. The shoulder belt section 18 extends laterally across the upper torso region of the occupant 8. The lap belt section 16 and the shoulder belt section 18 may be formed as portions of continuous seatbelt webbing or, alternatively, may be joined together at a respective end of each section.

Provided on the seatbelt 14 is a latch plate 22. The latch plate 22 may be slidable along at least a portion of the length of the seatbelt 14. When the seatbelt 14 is deployed, the latch plate 22 generally defines the transition between the lap belt section 16 and the shoulder belt section 18.

The seatbelt restraint system 10 also includes a buckle 20 located relative to one side of the seat 12. Like the seatbelt 14, the buckle 20 is secured to the vehicle body structure. The previously mentioned latch plate 22 is removably secured within the buckle 20. When the latch plate 22 is engaged with the buckle 20, the retractor provides for retraction of the seatbelt 14 gently against the body of the occupant 8. When the latch plate 22 is released from the buckle 20, the retractor provides for full retraction of the seatbelt 14 so that the seatbelt 14 will not inhibit the ingress and egress of the occupant 8 into and out of the vehicle.

To assist in controlling movement of the seatbelt 14, a guide loop 24 is usually fixed to a vehicle door pillar, such as the B-pillar (not shown), or to the seat 12 at approximately the shoulder height of the occupant 8. In some installations, the position of the guide loop 24 may be vertically adjustable. The guide loop 24 thus positions shoulder belt section 18 diagonally across the shoulder and chest of a seated occupant 8 and re-directs it back toward the retractor.

Figure 2:
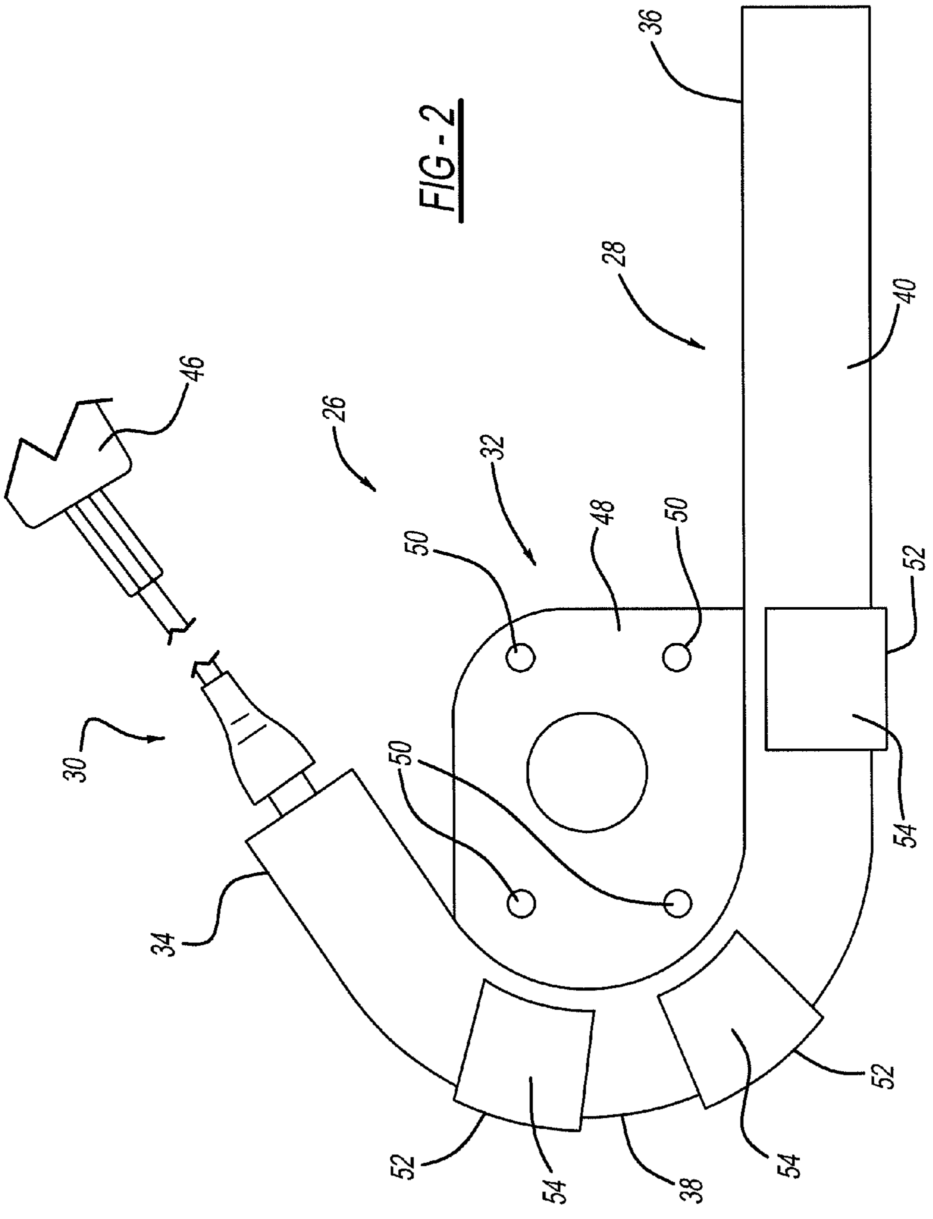
FIG. 2 is a side elevational view of a pretensioner in accordance with the principles of the present invention.
Figures 3, 4:
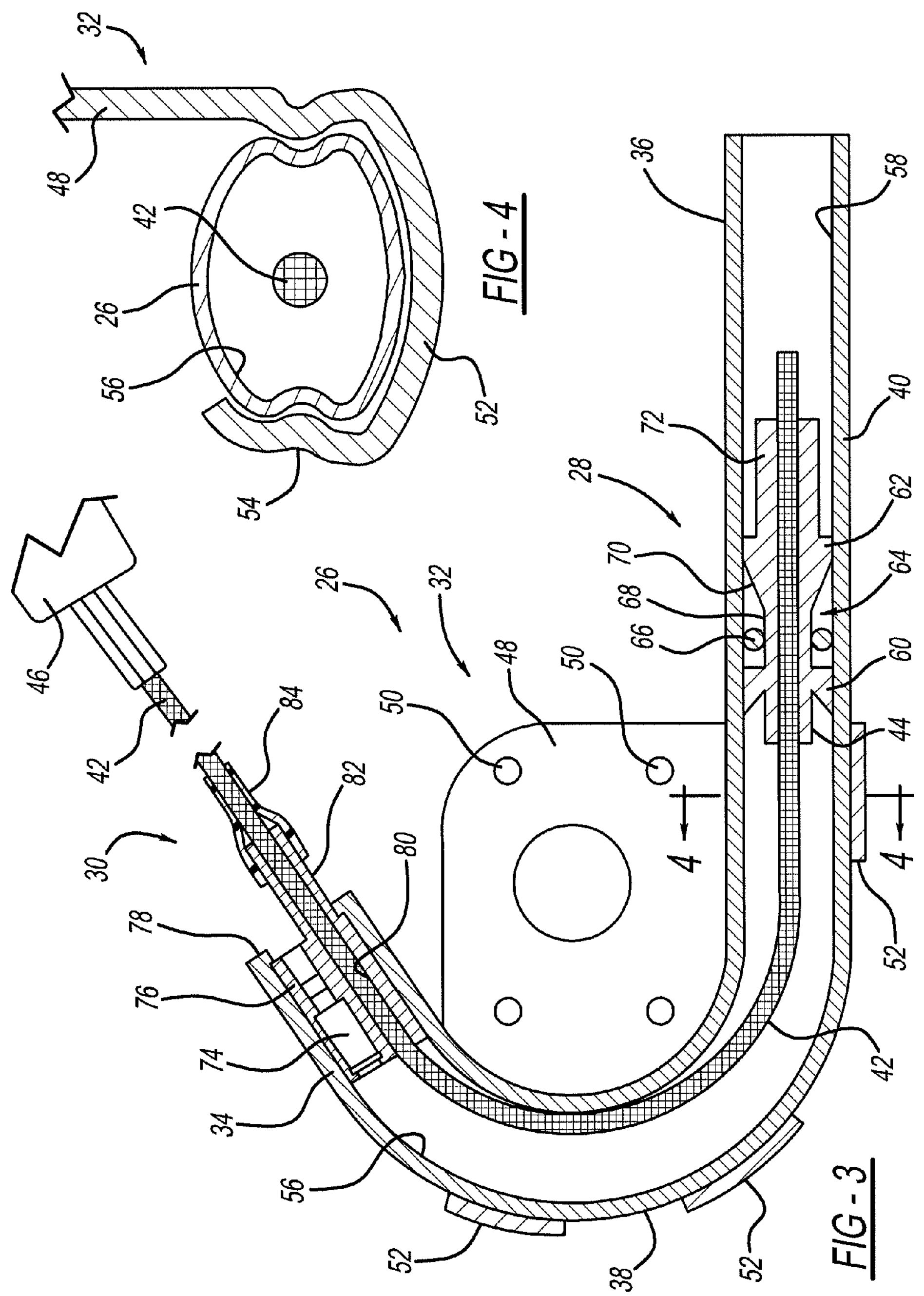
FIG. 3 is a side sectional view, generally taken along line 3-3, of the pretensioner shown in FIG. 2.
FIG. 4 is a cross-sectional view, generally taken transversely and along line 4-4, of the pretensioner seen in FIG. 2.

The seatbelt restraint system 10 also includes a linear pretensioner 26. One linear pretensioner 26 embodying the principles of the present invention is illustrated in FIGS. 2 through 4. As its primary components, the linear pretensioner 26 includes a housing 28, a piston and cable assembly 30 and a mounting bracket 32 and its construction is designed to provide a low cost pretensioner that is readily adaptable to various vehicle platforms by merely altering the mounting bracket of the pretensioner.

The linear pretensioner 26 is configured to be mounted to a structure of the vehicle. While the linear pretensioner 26 may be mounted in various locations, one preferred location is along the lateral side of the seat 12. By mounting the linear pretensioner 26 to the side of the seat 12, the piston and cable assembly 30 may readily be attached to either the buckle 20 or to an end of the lap belt section 16 of the seatbelt 14. As even a further possible mounting location for the linear pretensioner 26, the linear pretensioner 26 may be mounted to the side of the vehicle and to the end of the shoulder belt section 18. Regardless of the mounting position, the piston and cable assembly 30 of the linear pretensioning 26 is connected to either the buckle 20, an end of the lap belt section 16, an end of the shoulder belt section 18, or a component secured to one of those items. Collectively, these items and the connection are referred to as the belt restraint component 46. This collective designation of the belt restraint component 46 is in the discussion that follows with regard to FIGS. 2-8.

As previously mentioned, the linear pretensioner 26 includes a mounting bracket 32 used to secure the linear pretensioner 26 to the vehicle body or the seat 12. The mounting bracket 32 is formed from sheet stock and includes a flange 48 having apertures 50 through which fasteners, such as bolts, screws or rivets, may be inserted to secure the linear pretensioner 26 to the appropriate structure. Extending from edges of the flange 48, at spaced intervals, are a series of tangs 52. The tangs 52 are bent so as to extend at least partially around the housing 28, thereby generally circumscribing and securing the housing 28 with the mounting bracket 32. The tangs 52 may tightly encircle the housing 28 to retain it via a friction engagement or may be more robustly secured to the housing 28. Such other securement methods may include spot welding or bead welding the tangs 52 to the housing 28 or swaging the tangs 52 with the housing 28. FIG. 4 illustrates the mounting bracket 32 being retained with the housing 28 by means of a deformation engagement, such as a swaging engagement, which is designated at 54.

In accordance with one feature of the present invention, the housing 28 is formed of a simple conduit, such as tubing/piping. As such, the housing 28 is a conduit having opposing first and second ends 34, 36. In the current embodiment, the housing 28 includes a curved section 38 and a straight section 40. The curved section 38, as seen in FIGS. 2 and 3, is generally located toward the first end 34, while the straight section 40 extends from the curved section 38 to the second end 36. While the housing 28 is specifically illustrated with a curved section 38 being located at one of the ends of the housing 28 and the straight section 40 being located at the other end of the housing 28, the curved and straight sections 38, 40 need not be specifically located at the very ends of the housing 28. For example, the curved section 38 may be spaced apart a certain distance from the first end 34 with another, shorter straight section being positioned between the curved section 38 and the terminus of the first end 34. Similarly, the straight section 40 might not extend completely to the terminus of the second end 36. Rather, the terminus of the second end 36 might include an additional curved section or a differently shaped section. What is required, as will be appreciated from the discussion that follows, is that the housing 28 be formed of tubing, that a cable 42 of the piston and cable assembly 30 extends through the housing 28 and that a piston 44 of the piston and cable assembly 30 be moveably located in a section of the housing 28.

Referring now to FIG. 3, and as alluded to above, a passageway 56 is defined in the housing 28, through both the curved section 38 and the straight section 40. The passageway 56 in the straight section 40 of the housing 28 is herein referred to as a piston bore 58 since the piston 44 of the piston and cable assembly 30 is located therein.

Extending through the piston 44 is a central bore, which is provided for routing the cable 42 through the piston and attaching it thereto. The piston 44 further includes a pair of heads 60, 62 whose outer surfaces correspond in shape to the inside surface of the piston bore 58. Head 60 of the piston 44, which is the trailing head (in the direction of actuation, to the right in FIG. 3), preferably includes a groove that contains a seal (not shown) for effectively sealing the piston 44 within the piston bore 58.

Between the heads 60, 62 is a one-way clutch 64. The one-way clutch 64 is a design feature that prevents the piston 44 from moving in a reverse direction after actuation. To achieve this function, a series of roller balls 66 are provided in a position surrounding an annular surface 68 of the one-way clutch 64. During activation, gas pressure within the passageway 56 causes the piston 44 to be driven to the right in FIG. 3. After actuation, if forces are applied to the piston 44 to drive the piston 44 to the left, these forces would cause the roller balls 66 to move off of the annular surface and up on a conical surface 70 of the one-way clutch 64. Upon further movement to the left, the roller balls 66 become jammed or wedged between the conical surface 70 of the piston 44 and the interior surface of the piston bore 58, preventing movement of the piston 44. The one-way clutch 64 thus prevents back-driving of the linear pretensioner 26 after it has been actuated.

Beyond the leading head 62 of the piston 44 is a tubular extension 72. The tubular extension 72 enables the cable 42 to be attached to the piston 44 by passing the cable 42 through the tubular extension 72 and then crimping or otherwise firmly securing the tubular extension 72 to the cable 42. This additionally provides a means for sealing the piston 44 with respect to the cable 42.

At the opposing end of the housing 28, generally in the first end 34, a micro-gas generator 74 is mounted within the passageway 56. The micro-gas generator 74 is of a conventional design and is typically a cylindrical component used to pyrotechnically produce an expanding gas in response to a firing signal carried on a firing signal lead (not shown). As illustrated, the micro-gas generator 74 is integrally provided within a seal 76. The seal 76 forms an impervious gas seal with the interior surfaces of the passageway 56 thereby reducing pressure losses during firing of the micro-gas generator 74 and activation of the linear pretensioner 26. To retain the seal 76 in position within the passageway 56 of the housing 28, the terminus of the housing 28 at the first end may be rolled 78 or otherwise formed to capture the seal 76 within the passageway 56, and portions of the housing 28 may be provided with shoulders or stops (not shown) that limit insertion of the seal 76 into the passageway 56.

The seal 76 further includes a cable bore 80 through which the cable 42 passes. As such, the cable 42 is routed from the piston 44 through the passageway 56 and through the seal 76, where it exits from the housing 28. Thereafter, the cable 42 is secured to the belt restraint component 46. To facilitate sealing about the cable 42 in the location where the cable 42 exits the seal 76, the seal 76 may be provided with a cylindrical extension 82 forming a nipple or boss through which the cable 42 passes. As seen in FIG. 3, shrink-fit plastic tubing 84 is provided around the boss 82 and cable 42, where the cable 42 exits the boss 82, and thus creates a an additional seal to prevent the escape of combustion gas through the cable bore 80.

As thus described, when an impact is anticipated or initially detected, a firing signal is received by the micro-gas generator 74 causing it to produce combustion gas within the passageway 56. Since the passageway 56 of the housing 28 is sealed at both ends, the combustion gas acts upon the head 60 of the piston 44 and causes the piston 44 to be advanced (to the right in FIG. 3) within the piston bore 58. With advancement of the piston 44, tension is imparted to the cable 42, which in turn imparts tension to the belt restraint component 46 and the lap and shoulder belt sections 16, 18 of the seatbelt 14. By pretensioning the seat belt 14, the lap and shoulder belt sections 16, 18 engage the occupant 8 prior to or at the onset of the impact of the vehicle. Earlier engagement of the seatbelt 14 with the occupant 8 decreases the likelihood of injury to the occupant during a vehicle impact or collision.

Figure 5:
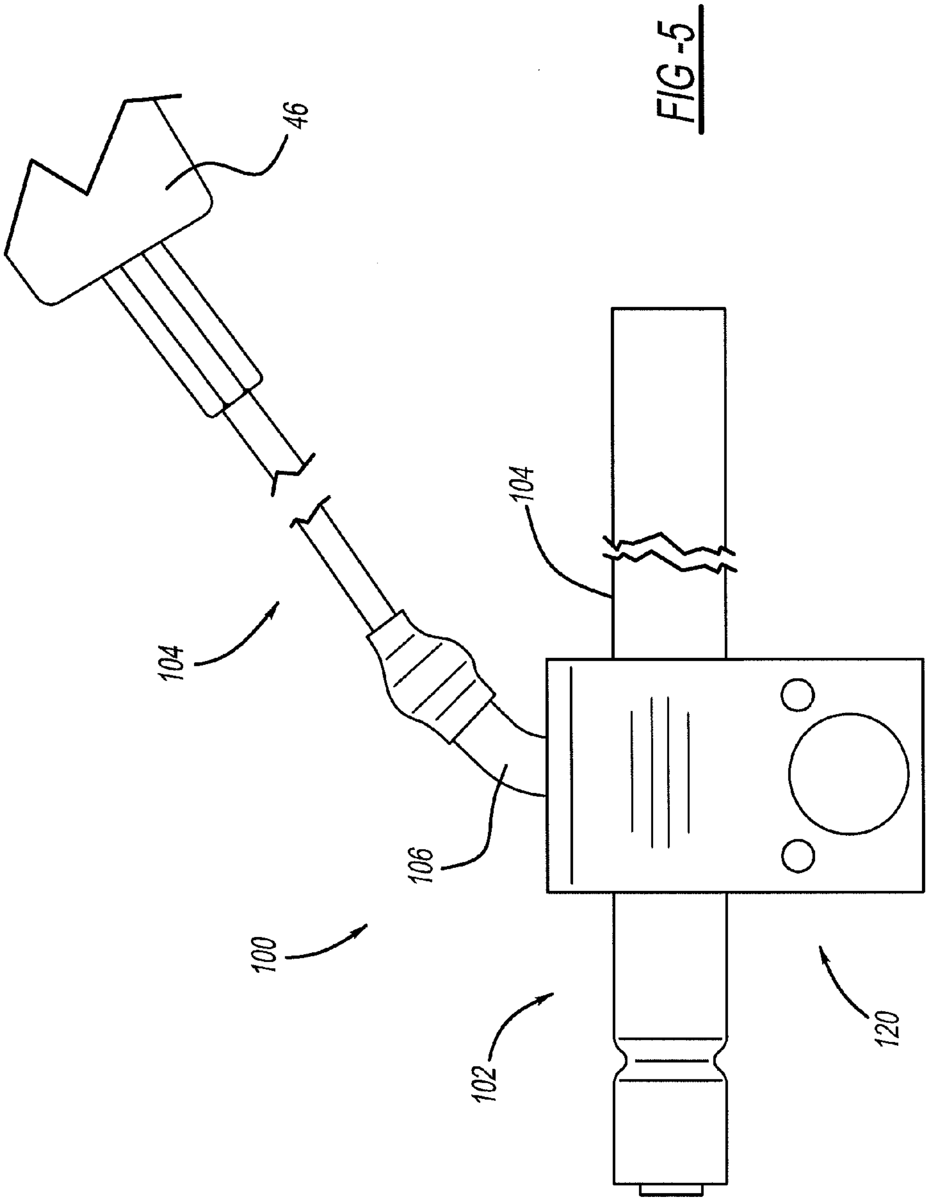
FIG. 5 is a side elevational view of a second embodiment of a pretensioner incorporating the principles of the present invention.
Figure 7:
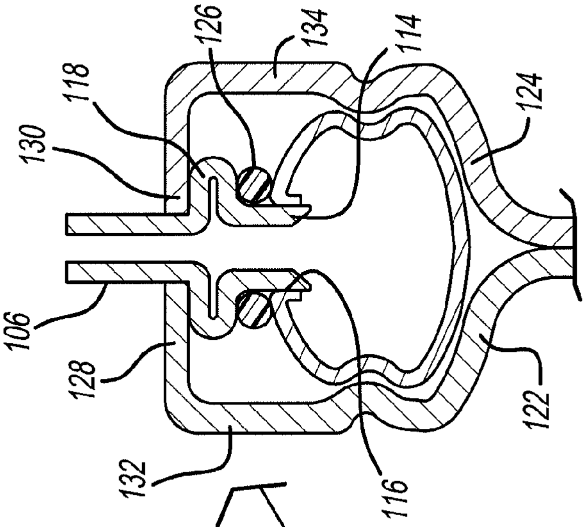
FIG. 7 is a lateral cross-sectional view, similar to that seen in FIG. 4, generally taken along line 7-7 in FIG. 5.
Figure 6:
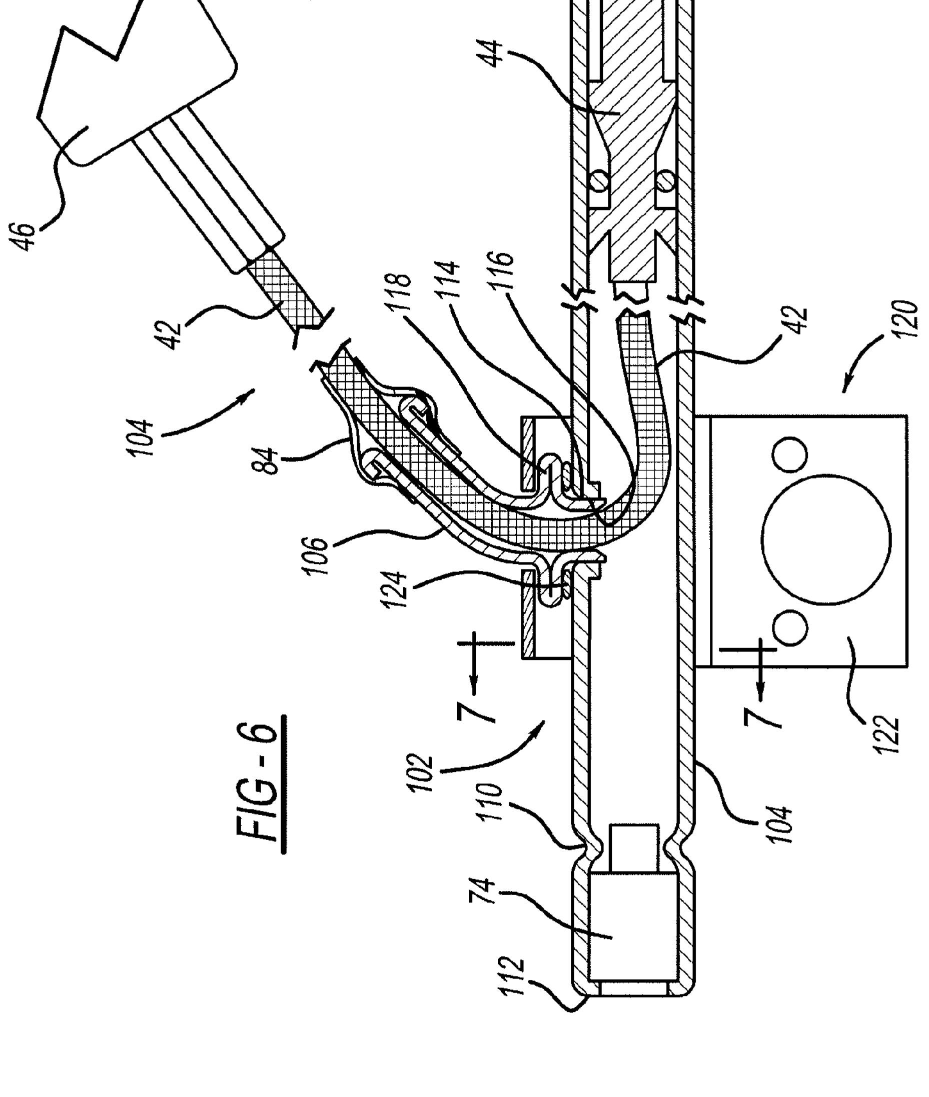
FIG. 6 is a longitudinal cross-sectional view generally taken along line 6-6 in FIG. 5.

Referring now to FIGS. 5-7, a further embodiment of a linear pretensioner is shown therein and designated as 100. This embodiment includes many features that are the same as those discussed in connection with the prior embodiment, including the piston and cable assembly 30, the belt restraint component 46 and the micro-gas generator 74. Accordingly, these and other like features are designated with the same reference numerals and are not discussed in significant detail. The reader's attention is respectfully directed to corresponding portions of the prior discussion for specifics on those features. Notwithstanding the above, one difference between the embodiment of FIGS. 5-7 and that of FIGS. 2-4 is in the formation of their respective housings.

As seen in FIG. 6, the linear pretensioner 100 is provided with a housing 102 having a two-piece construction, which includes a piston housing 104 and a cable housing 106. Both the piston housing 104 and the cable housing 106 are formed from a round, cylindrical conduit, such as tubing/piping.

The piston housing 104 is a length of straight conduit that defines a piston bore 108 therethrough. Accordingly, located within the piston housing 104 is the piston 44 of the piston and cable assembly 30. Located toward an opposing end of the piston housing 104 is the micro-gas generator 74. As with the prior embodiment, the piston 44 and the micro-gas generator 74 are sealingly engaged with the interior surfaces of the piston bore 108, with the micro-gas generator 74 being retained in its position within the piston housing 104 by the formation of crimps/stops 110 or rolled ends 112 adjacent to the micro-gas generator 74.

The cable housing 106 is a curved section of conduit and intersects with the piston housing 104, between the locations of the piston 44 and the micro-gas generator 74, such that the interior of the cable housing 106 is in communication with the interior of the piston housing 104. As seen in FIG. 6, at the point of intersection between these two housings 104 and 106, the cable housing 106 and the piston housing 104 are substantially perpendicular to one another.

The inserted end 114 of the cable housing 106 is received through an opening 116 formed in the piston housing 104. The opening 116 is preferably punched or stamped into the piston housing 104 and has a diameter that permits insertion of the inserted end 114 of the cable housing 106 therein. Adjacent to the inserted end 114, the cable housing 106 is longitudinally deformed. This deformation results in the formation of a radial flange 118 adjacent to the inserted end 114, which operates as a clamping and sealing surface to retain and seal the cable housing 106 with the piston housing 104. This retention is achieved through the use of a mounting bracket 120 engaging the radial flange 118.

The mounting bracket 120 is constructed of two half members 122 and 124 that are themselves formed from sheet stock. With the inserted end 114 of the cable housing 106 located within the opening 116 of the piston housing 104, and with a seal 126 provided between the radial flange 118 and the exterior surface of the piston housing 104 surrounding the opening 116, the half members 122, 124 are placed within a forming die and clamped or crimped about the intersection of the cable housing 106 and the piston housing 104, as is seen in FIG. 7. As a result, a transverse end flange 128 of each half member 122, 124 exerts pressure on the radial flange 118, opposite of the seal 126, thereby ensuring a gas impervious connection at the intersection of the piston and cable housings 104 and 106. On the opposing side of the piston housing 104 (the lower side in FIG. 7), the half members 122, 124 are deformed beneath the piston housing 104, providing the reactionary force to ensure clamping of the radial flange 118 to the piston housing 104. For additional securement, the lateral sides 132, 134 of the half members 122, 124 may be crimped or swaged inwardly, thereby forming an engaged deformation between the lateral sides 132, 134 and the sides of the piston housing section 104.

Figure 8:
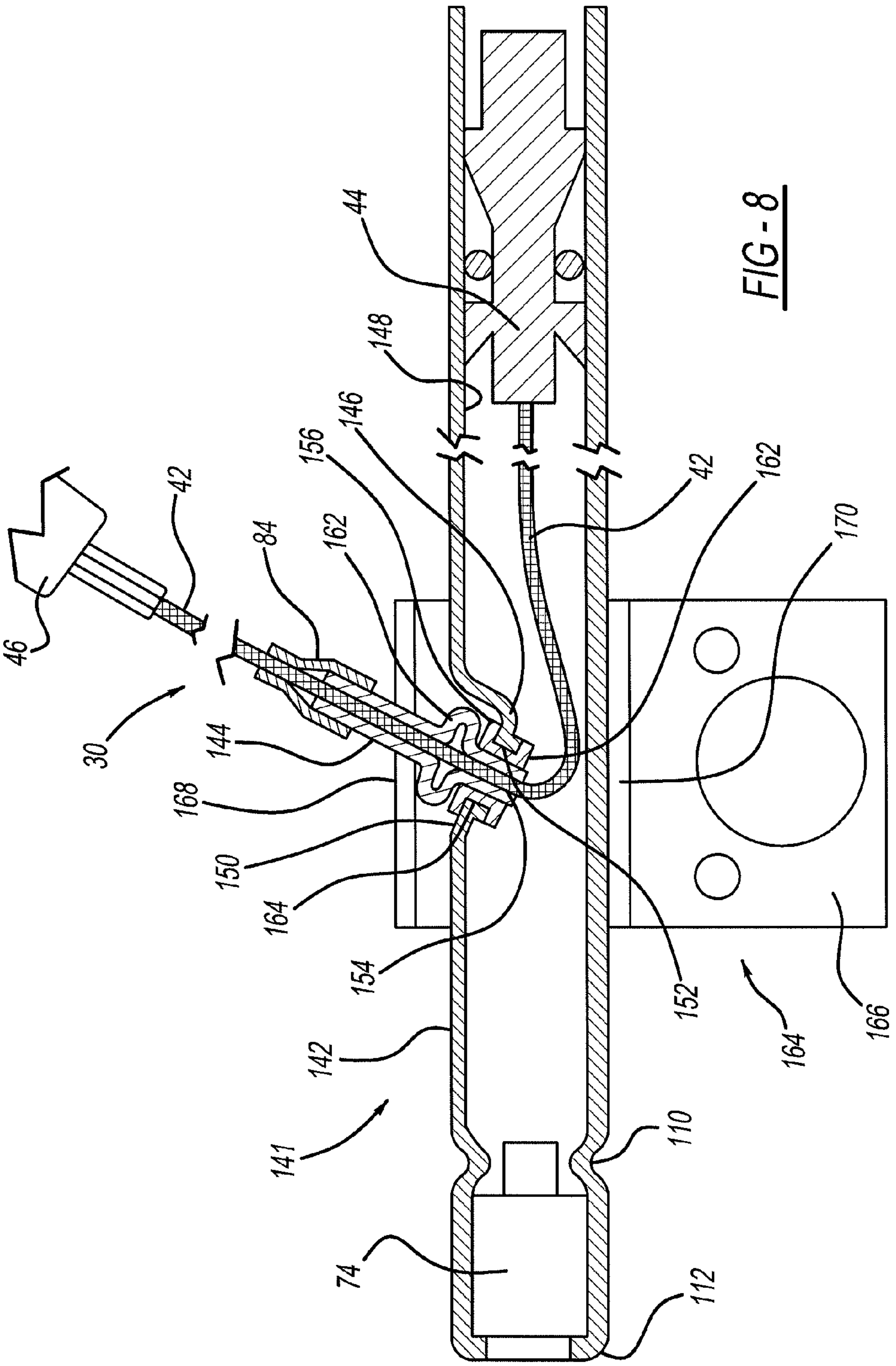
FIG. 8 is a longitudinal cross-sectional view, similar to that seen in FIG. 6, of another embodiment of a pretensioner incorporating the principles of the present invention.

An additional embodiment of a pretensioner according to the principles of the present invention is further illustrated in FIG. 8 and designated at 140. The pretensioning 140 seen in FIG. 8 incorporates many the same features of the earlier discussed embodiments, and particularly the immediately preceding embodiment. Where features are the same as those in the preceding embodiments, common reference numerals have been employed and a discussion of those features will not be undertaken since it is redundant to the prior discussion. Again, the reader's attention is respectfully directed to the corresponding portions of this disclosure for specifics related to these features.

As previously mentioned, the embodiment of FIG. 8 is similar to the embodiment seen in FIGS. 5-7. The embodiments differ from each other principally in the construction and interaction of their respective piston housings 104, 142 and cable housings 106, 144. Like the prior embodiment, the piston housing 142 and the cable housing 144 are formed from a round, cylindrical conduit such as tubing/piping. Unlike the prior embodiment, in the current embodiment, the cable housing 144 intersects with the piston housing 142 at an oblique angle. It will be recalled that in the prior embodiment, the intersection between the piston housing 104 and cable housing 106 was at a perpendicular angle. An additional distinction between the two embodiments is that the cable housing 144 is a substantially straight member and not curved like the cable housing 106 of the prior embodiment.

To allow the straight cable housing 144 to be mounted at an oblique angle relative to the piston housing 142, the piston housing 142 is provided with a recess 146 in its sidewall in an area preceding a piston bore 148 defined by the piston housing 142. The recess 146 defines an oblique wall 150 in which an opening 152 is formed. Inserted into the opening 152 is the inserted end 154 of the cable housing 144. A variety of seals may be employed to prevent the leakage of combustion gases through the opening 152. In the illustrated embodiment of FIG. 8, a seal 156 is provided in which the seal includes a pair of annular flanges 158 connected by a cylindrical portion 160. When mounted in the opening 152, the annular flanges 158 are located over opposing surfaces adjacent to the opening 152 with the cylindrical portion 160 extending through the opening 152. The diameter of the passageway through the cylindrical portion 160 of the seal 156 is such that the inserted end 154 of the cable housing 144 is in surface to surface, sealing engagement with the inner surface of the cylindrical portion 160.

Like the embodiment seen in FIG. 6, the embodiment of FIG. 8 may include a longitudinally deformed portion that defines a radial flange 162 whose function is to aid in securing the cable housing 144 to the piston housing 142. In this regard, a mounting bracket 164 is provided in the form of two half members 166 (only one of which is shown), with the half members 166 being formed such that an end flange 168, in cooperation with an opposing section 170 of the half member 166, exerts a clamping force upon the radial flange 162 generally in the direction of the piston housing 142. As a result, the radial flange 162 is forced into contact with the annular flange 158 of the seal 156, providing an additional sealing mechanism for the intersection of the cable housing 144 with the piston housing 142.

When the motor vehicle occupant restraint system 10 calls for actuation of the linear pretensioner 26, 100, 140, in each of the embodiments a firing signal is sent to micro-gas generator 74, which pyrotechnically generates a rapidly expanding gas that pressurizes piston bore 58, 108, 148. This forces piston 44 to advance along the piston bore 58, 108, 148, in the right-hand direction of the figures, with a stroke length terminating near the end of piston bore 58, 108, 148. The length of cable 42 may be chosen such that piston 44 will not escape from the piston bore 58, 108, 148 after actuation. As an alternative, other mechanical features can be provided to limit the maximum stroke of piston 44, such as restricting the diameter of piston bore 58, 108, 148 at the right-hand end thereof. Forcible motion of piston 44 pulls cable 42 through the housing 28, 102, 141, which pulls on the belt restraint component 46. This action provides the pretensioning displacement for the seatbelt 14 desired for enhancing performance of the seat belt restraint system 10.

The advantages of the configuration pretensioners incorporating the principles of the present invention are many. Principally, by forming housing 28, 102, 141 using straight and bent tubular parts and forming the mounting bracket 32, 120, 164 using sheet stock, design changes and adaptations can be readily accomplished with relatively low cost investment in tooling. Moreover, the linear pretensioner 26, 100, 140 can be made light weight and compact, and readily adaptable across various vehicle platforms merely by reconfiguring the mounting bracket 32, 120, 164 of the pretensioning or 26, 100, 140.

While the above description constitutes the preferred embodiment of the present invention, it will be appreciated that the invention is susceptible to modification, variation, and change without departing from the proper scope and fair meaning of the accompanying claims.

We claim:

1. A pretensioner for a motor vehicle belt restraint system, the belt restraint system being of the type mountable to a structure of the motor vehicle and having a belt restraint component coupled thereto, the pretensioner adapted to be connected to the belt restraint component and, upon being activated, the pretensioner pulling the belt restraint component to pretension the belt restraint system, the pretensioner comprising:

- a conduit made of a single piece of tubing and having first and second ends, a curved portion of the conduit located between the first and second ends, at least a portion of the conduit defining an elongated piston bore;
- a piston slideably positioned in the piston bore,
- a cable attached to the piston, the cable extending through the conduit and being adapted for connection to the belt restraint component;
- a gas generator located within the conduit and being positioned generally opposite of the piston, whereby upon activation of the gas generator a gas is generated within the piston bore and drives the piston within the piston bore with the piston exerting tension on the cable and thereby the belt restrain component.

2. The pretensioner according to claim 1, wherein the cable extends into the conduit through the curved section.

3. The pretensioner according to claim 1, further comprising a mounting bracket secured to the conduit, the mounting bracket being secured to the conduit by mechanical engagement of a deformed section of the mounting bracket and a deformed section of the conduit.

4. The pretensioner according to claim 1, wherein the conduit has a cross-sectional shape that is round over a majority of the conduit's length.

5. The pretensioner according to claim 4, wherein the conduit has a portion between its first and second ends that is non-round in cross-sectional shape.

6. A pretensioner for a motor vehicle belt restraint system, the belt restraint system being of the type mountable to a structure of the motor vehicle and having a belt restraint component coupled thereto, the pretensioner adapted to be connected to the belt restraint component and, upon being activated, the pretensioner pulling the belt restraint component to pretension the belt restraint system, the pretensioner comprising:

- a conduit made of tubing and having first and second ends, at least a portion of the conduit defining an elongated piston bore;
- a piston slideably positioned in the piston bore,
- a cable attached to the piston, the cable extending through the conduit and being adapted for connection to the belt restraint component;
- a gas generator located within the conduit and being positioned generally opposite of the piston, whereby upon activation of the gas generator a gas is generated within the piston bore and drives the piston within the piston bore with the piston exerting tension on the cable and thereby the belt restrain component,
- wherein the gas generator is generally located in the curved section of the conduit and the piston is located in the straight section of the conduit.

7. A belt restraint system for a motor vehicle, the belt restraint system comprising:

- a webbing having opposing ends and configured to be mounted to a structure of the motor vehicle;
- a latch plate supported by the webbing between the opposing ends, the latch plate defining a lap belt section and a shoulder belt section of the webbing;
- a buckle configured to be mounted to a structure of the motor vehicle, the latch plate being releasably engageable with the buckle;
- a belt restraint component configured to be mounted to a structure of the motor vehicle, the belt restraint component being connected to the webbing and applying tension to the webbing when tension is applied to the belt restraint component;
- a pretensioner configured to be mounted to a structure of the vehicle, the pretensioner further comprising:
  - a conduit made of tubing and having first and second ends, a portion of the conduit forming an elongated piston bore;
  - a piston slideably positioned in the piston bore,
  - a cable attached to the piston, the cable extending through the conduit and being connected to the belt restraint component; and
  - a gas generator located within the piston bore of the conduit and being positioned generally opposite of the piston, the gas generator being generally located in the first end of the conduit and the piston being located in a straight section of the conduit toward the second end;
  - a mounting bracket secured to the conduit, the mounting bracket being secured to the conduit by engagement of a deformed section of the mounting bracket with a deformed section of the conduit; and
  - whereby upon activation of the gas generator a gas is generated within the piston bore and drives the piston within the piston bore with the piston exerting tension on the cable and thereby on the belt restrain component, tension on the belt restrain component imparting tension in the webbing.

8. The pretensioner according to claim 7, wherein the conduit is straight.

9. The pretensioner according to claim 8, wherein the conduit is a first conduit and a second conduit engages the first conduit between the first and second ends, the cable extending through the second conduit and into the first conduit.

10. The pretensioner according to claim 9, wherein the second conduit is substantially straight or curved along its length.

11. The pretensioner according to claim 9, wherein the second conduit engages the first conduit at an oblique angle or a perpendicular angle to a longitudinal axis defined by the first conduit.

12. The belt restraint system according to claim 7, wherein the conduit includes a straight section and a curved section, the curved section being located toward the first end.

13. The belt restraint system according to claim 12, wherein the cable extends into the conduit through the curved section.

14. The belt restraint system according to claim 7, wherein the conduit is a first conduit and a second conduit engages the first conduit between the first and second ends, the cable extending through the second conduit and into the first conduit.

15. The belt restraint system according to claim 14, wherein the second conduit is one of substantially straight or curved along its length.

16. The belt restraint system according to claim 14, wherein the second conduit engages the first conduit at an oblique angle or a perpendicular angle to a longitudinal axis defined by the first conduit.

* * * * *